March 21, 1939.  L. B. NEAR ET AL  2,150,984
COMBINED CRUSHING AND FEEDING DEVICE FOR JUNK SHREDDING MACHINES
Filed April 19, 1937  3 Sheets-Sheet 1.
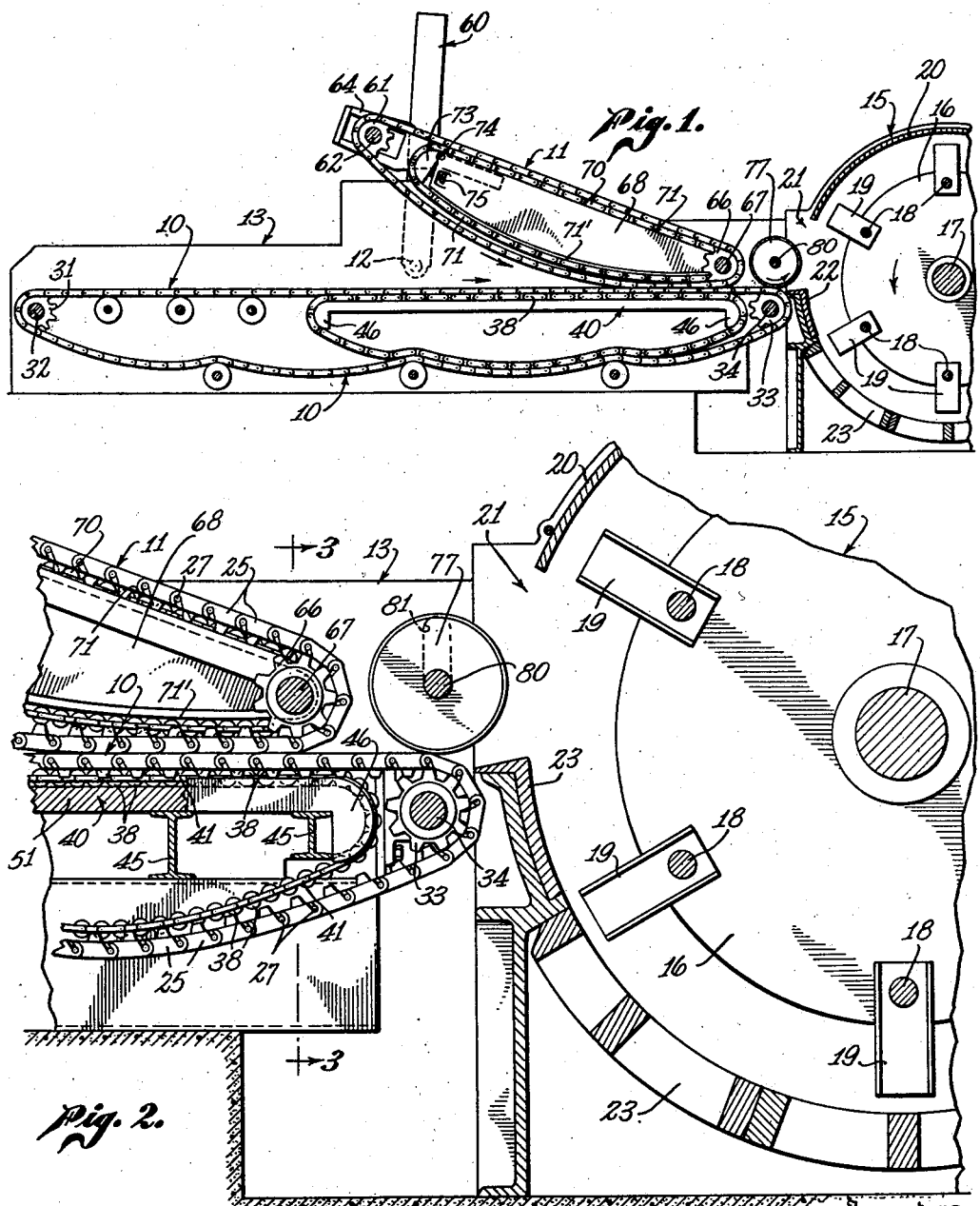
Inventors
Lloyd B. Near
Sidney G. Gillette March 21, 1939. L. B. NEAR ET AL 2,150,984
COMBINED CRUSHING AND FEEDING DEVICE FOR JUNK SHREDDING MACHINES
Filed April 19, 1937   3 Sheets-Sheet 2
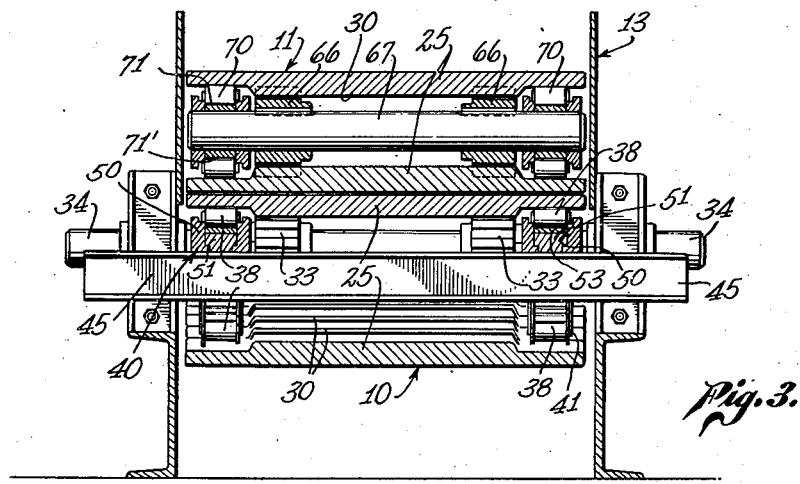
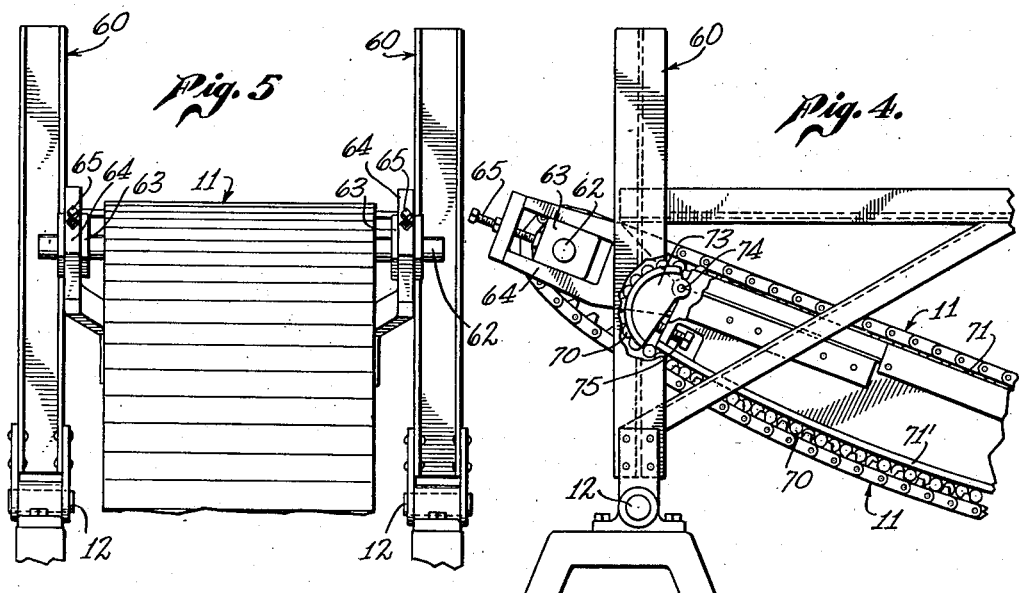
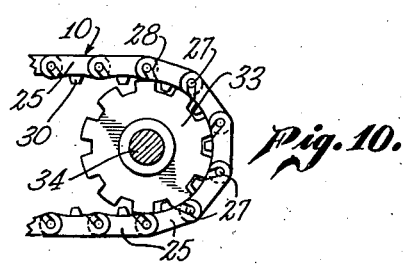
Inventors
Lloyd B. Near
Sidney G. Gillette
Attorney

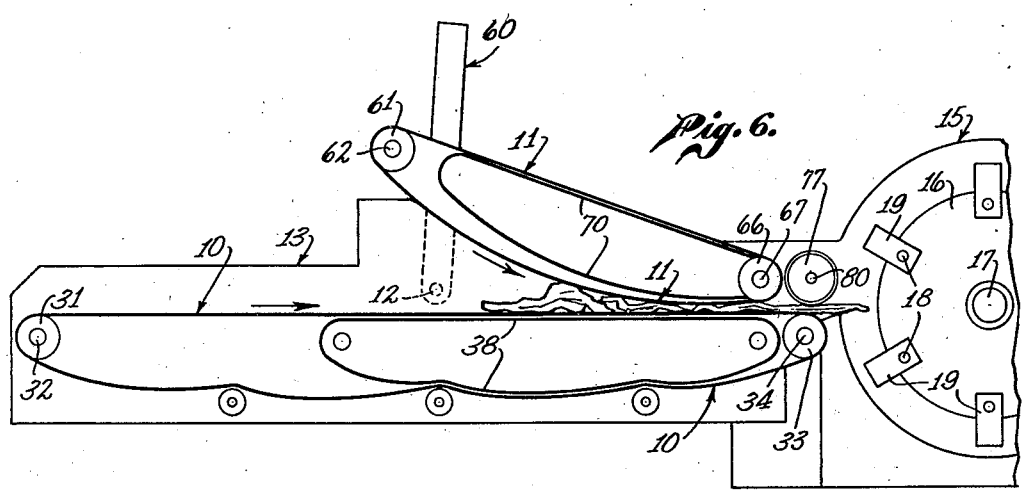
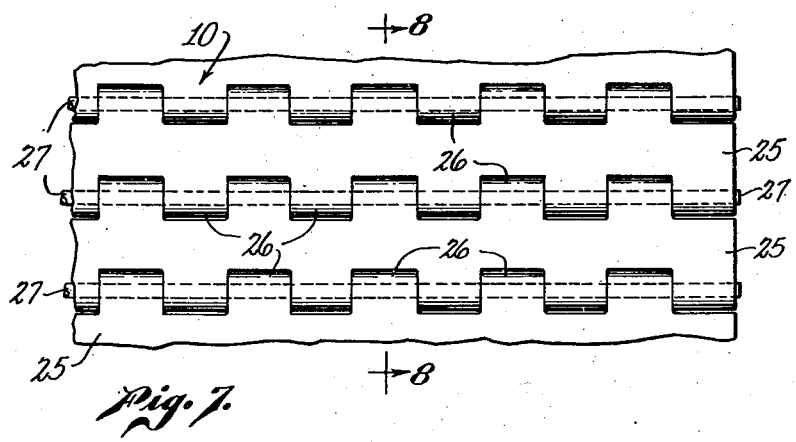
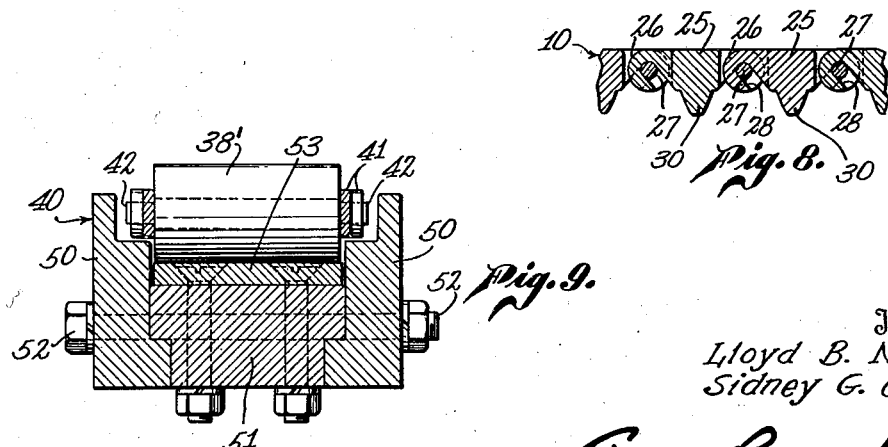

Patented Mar. 21, 1939

2,150,984

UNITED STATES PATENT OFFICE 2,150,984

COMBINED CRUSHING AND FEEDING DEVICE FOR JUNK SHREDDING MACHINES

Lloyd B. Near, La Crescenta, and Sidney G. Gillette, Alhambra, Calif., assignors to Los Angeles By-Products Co., a corporation of California Application April 19, 1937, Serial No. 137,722

7 Claims. (Cl. 29—4.5)

This invention relates generally to the preparation of discarded junk material for melting purposes.

It is well known that scrap iron has long formed one of the sources of raw material of the steel industry. This scrap material includes machine cuttings and scrap from foundries and sheet metal works, all such material being largely of such character as to be easily handled. This invention, however, relates particularly to the preparation for melting of the bulky type of scrap material such as is obtained from dumps and junkyards. The invention is particularly useful for the preparation of the sheet metal parts of automobiles, such as fenders, hoods, doors and the like.

By reason of the bulkiness of scrap material of the class referred to, it has been extremely difficult to handle the material during the preliminary steps, particularly during the step of feeding such material to that part of the machine which shreds the material into small pieces. After the material has been shredded, the subsequent steps of removing the non-ferrous material may readily be accomplished and the material be bailed for shipment, for instance as described in the method disclosed in Letters Patent No. 2,059,229, issued November 3, 1936, and for which the present invention was particularly designed as a preliminary step.

Shredding of the scrap iron material is accomplished by subjecting it to the operation of a machine having a number of blades or hammers which are rotated against the scrap material at an extremely high speed. Heretofore devices for feeding the scrap material to such shredding machines have been crude and it has been an extremely dangerous operation to the operator of the machine. In this connection, it will be understood, that the bodies of used automobiles usually contain non-metallic parts, such as wood fittings, glass plates and the like, and that for the purpose of handling the parts the bodies are roughly dismembered into the component body parts such as doors, fenders, hoods, and bodies. It is these bulky parts which are fed to the machine and which the present feeding machines do not adequately handle.

It therefore is a primary object of this invention to provide a simple and efficient feeding device for use with a shredding machine which crushes the bulky scrap iron of the type described into a comparatively uniform bulk without endangering the operator and which firmly holds the scrap material and guides it directly to the blades or hammers of the shredding machine.

It is also an object of this invention to provide a feeding device of the character described which will accommodate bulky scrap iron material and which is effective to loosen and separate the non-metallic from the metallic parts of the scrap material during the feeding operation before the material reaches the shredding machine.

It is a further object of the invention to make the belt forming the material carrying bed of such construction as to permit the delivery end of the belt to be placed close to the anvil, so that the material on the belt is caused to move across the anvil into the path of the blades of the shredding machine, a grip on the material being maintained as close to the anvil as possible. This feature prevents the blades or hammers from knocking the material back toward the feeding mechanism and reduces shocks on the shredding machine.

A further object is to provide the belts with teeth which pass over a wheel having teeth receiving notches, the teeth and notches in the wheels being so formed that the teeth enter and leave the notches in the wheel with little or no friction between the teeth and wheel.

Other objects and advantages will appear from the following description and drawings. Referring to the drawings, which are for illustrative purposes only:

Fig. 1 is a longitudinal sectional view on a small scale showing an apparatus embodying one form of my invention;

Fig. 2 is an enlarged vertical sectional view of the discharge end of the feeding device.

Fig. 3 is a sectional view on line 3—3 of Fig. 2;

Fig. 4 is an enlarged side view of the pivotal end of the crushing belt;

Fig. 5 is an end view of the apparatus shown in Fig. 4;

Fig. 6 is a diagrammatic elevation of the apparatus shown in Fig. 1, illustrating the action of the machine on the scrap;

Fig. 7 is a face view of one of the belts;

Fig. 8 is a cross section of the belt on line 8—8 of Fig. 7; and

Fig. 9 is an enlarged cross section of the roller supporting track.

Fig. 10 is an enlarged diagrammatic view of one of the belt driving wheels and belt thereon.

Referring more particularly to the drawings, the apparatus as illustrated in Fig. 1 consists generally of a horizontal traveling belt 10 forming a moving bed or platform for receiving the junk material and 11 indicates a traveling pressing or crushing belt pivotally supported at 12 on the frame 13 of the apparatus. Reference numeral 15 generally indicates the shredder or pounder which consists of a drum 16 mounted on a shaft 17 driven from any suitable source at high speed. The drum 16 has pivotally mounted thereon by means of pins 18 a plurality of blades or shredding units 19. The shredder is covered by means of a housing 20 having a feed opening 21 through which the scrap material is delivered from the crushing and feeding apparatus into the shredder. Numeral 22 indicates an anvil which supports the scrap material as it enters the shredder and 23 indicates a grate through which the shredded material is discharged after the shredding operation.

The belt 10 consists of a plurality of bars 25 as illustrated in Figs. 7 and 8. The bars have interlocking ears indicated at 26 through which a shaft or pin 27 is extended, thereby forming an articulated belt preferably made of steel to withstand wear and the weight of the scrap material and crushing belt thereabove, the upper run of the belt 10 forming a material receiving bed. For the purpose of permitting repair and easy assembly of the belt each of the ears 26 is recessed or slotted as indicated at 28 so that the ears may be hooked over the shafts or pins 27.

Each of the bars 25 is formed on its inner face with a rib indicated at 30 shaped in cross section substantially like that of an epicycloidal gear tooth for engagement with notched wheels 31 at the receiving end of the machine mounted on a cross shaft 32 and with notched wheels 33 mounted on a shaft 34 at the delivery end of the belt, the shaft 34 being driven from any suitable power source. It is to be understood that the ribs 30 not only serve as teeth but also constitute as stiffening members for the bars.

For the purpose of minimizing friction and for affording a moving support 38 for the belt 10 through that portion of its course upon which the scrap material is crushed, we provide a series of rollers 38' under and at each side of the belt which run upon tracks generally indicated at 40 in Fig. 9, the rollers being pivotally connected to each other at each end by means of links 41 and pins 42, thereby forming a linked roller support. The tracks 40 are supported on cross bars 45 forming part of the frame of the apparatus and terminate in curved portions indicated at 46 at each end of the upper run of the rollers, the rollers on the return run being unsupported.

The tracks 40 consist of side members 50 and an intermediate strip 51 bolted together by means of a bolt 52, the strip 51 being covered by a plate 53 of hardened metal forming a wear plate upon which the rollers travel. From the above description of the traveling bed or belt 10 it will be understood that the belt is supported throughout that portion of its upper run where the crushing of the scrap material takes place by what may be termed an anti-friction rolling support.

The crushing belt 11, as indicated above, is pivotally supported to the frame of the apparatus by the shaft 12 upon which is pivotally mounted what may be termed the crusher frame 60. The crushing belt is of the same form and construction as that described above with relation to the belt 10 and is engaged at one end by notched wheels 61 mounted on shaft 62 which in turn are mounted in blocks 63 in guides 64 by means of bolts 65, the guides 64 being welded or otherwise secured to the crusher frame 60. The belt 11 at the delivery end engages notched wheels 66 mounted on a shaft 67 supported in an extension 68 of the crusher frame 60. The belt 11 on its upper run is supported on a roller support 70 of the same construction as that described with respect to the support for the belt 10. This roller support passes around a track indicated at 71 which at one end is formed with a segment 73 pivotally connected at 74 to the frame of the machine and adjustable by means of bolt 75 to properly position the roller support with respect to the belt 11. On the return run of the roller support for the belt 11 the rollers engage a track or plate 71'.

It will be noted that the delivery end of the belt 10 is close to the anvil 22, the upper face of the anvil being approximately in line or slightly below the upper face of the belt, a compresser roll 77 of heavy structure being mounted above the belt 10 at its delivery end on a shaft 80 movable vertically in slots 81 indicated in dotted lines in Fig. 2.

The apparatus operates in the following manner: Scrap material such as automobile doors, fenders and similar articles are placed upon the belt 10 and are carried thereon toward the shredder. As such articles pass toward the shredder they are engaged by the crushing belt 11 as diagrammatically shown in Fig. 6. At this point in their travel the belt 10 is supported on the linked roller support under the belt 10 which together with the roller support and the belt 10 form a bed which supports the material and the weight of the crushing belt. The belts 10 and 11 converge as the material is fed toward the shredder and the crushed material indicated at 90 in Fig. 6 passes under the roller 77 which holds the crushed material on the inner end of belt 10 as it passes over the anvil and is engaged by the shredding blades 19. With the arrangement of parts just described the material is crushed to a compact mass and held on the anvil until engaged by the shredding blades.

In Fig. 10 the structure of one of the wheels 33 is shown diagrammatically.

All clearances have been exaggerated as well as the amount of slip-back of the chain on the wheel. This slip-back which occurs on the disengagement is very small and the surfaces between which the slip occurs are of very large area, thus keeping the actual wear very low.

The action of this drive is due to the fact that the pitch line of the chain is outside of the line of engagement of the teeth and the wheel. The action of the tooth in disengaging is to pull ahead and away from the wheel at the same time.

We claim as our invention:

1. In a device for feeding scrap material: a traveling belt having a substantially horizontal upper run forming a substantially flat material receiving bed; a series of supporting rollers under the upper run of the belt; supporting means for the rollers; means for pivotally connecting the rollers to each other to form a roller bearing chain; means for driving the belt; and a crushing member, said crushing member consisting of a traveling belt, having a substantially flat material engaging face, pivotally mounted at one end and freely movable vertically at the other end to engage material on said first named traveling belt.

2. In a device for feeding scrap material: a traveling belt having a substantially horizontal upper run forming a material receiving bed; a series of supporting rollers under the upper run of the belt; supporting means for the rollers; means for pivotally connecting the rollers to each other to form a roller bearing chain; means for driving the belt; and a crushing member; said crushing member consisting of a traveling belt pivotally mounted at one end and freely movable vertically at the other end to engage material on said first named traveling belt, both of said traveling belts consisting of a series of bars extending transversely of the belt pivotally connected to each other, forming substantially flat material engaging faces.

3. In a device for feeding scrap iron: a traveling belt having a substantially flat horizontal upper run forming a material receiving bed; a traveling linked roller support under each side of the upper run of said traveling belt; a flat crushing belt above the traveling belt; means for pivotally supporting said crushing belt at one end; said crushing belt being freely movable vertically at its other end; a continuous traveling linked roller support for the upper run of said crushing belt and track means for the upper and lower run of the traveling linked roller support.

4. In a device for feeding scrap iron: a traveling belt having a substantially flat horizontal upper run forming a material receiving bed; a traveling linked roller support under each side of the upper run of said traveling belt; a flat crushing belt above the traveling belt; means for pivotally supporting said crushing belt at one end, said crushing belt being freely movable vestically at its other end, a continuous traveling linked roller support for the upper run of said crushing belt and track means for the upper and lower run of the traveling linked roller support, said traveling belt and crushing belt both consisting of a series of cross bars pivotally connected to each other; and means for driving said traveling belt.

5. In combination: a rotatable scrap material shredding member; a flat traveling supporting belt forming a bed for receiving the scrap material; means for supporting the upper run of said belt; means for driving said belt; a flat traveling crushing belt mounted above said belt; means for pivotally supporting one end of the crushing belt and allowing free vertical movement at its other end; and an anvil member between the delivery end of said first mentioned belt and said shredding member to support the crushed material as it is discharged directly thereon from the supporting belt.

6. In combination: a rotatable scrap material shredding member; a traveling supporting belt forming a bed for receiving the scrap material; means for supporting the upper run of said belt; means for driving said belt; a traveling crushing belt mounted above said belt; means for pivotally supporting one end of the crushing belt and allowing free vertical movement at its other end; an anvil member between the delivery end of said first mentioned belt and said shredding member to support the crushed material as it is discharged directly thereon from the supporting belt; and a floating pressure roller above the delivery end of said supporting belt engageable with the material thereon.

7. In combination: a scrap material shredding member having a feed opening, an anvil therein, and a pair of crushing belts having their material engaging faces converging toward the feed opening of the shredding member, one of said belts forming a material receiving bed for the material discharging the crushed material directly on said anvil.

LLOYD B. NEAR.
SIDNEY G. GILLETTE.